US008682939B2

(12) United States Patent
McNeal et al.

(10) Patent No.: US 8,682,939 B2
(45) Date of Patent: Mar. 25, 2014

(54) VIDEO AND AUDIO RECORDING USING FILE SEGMENTATION TO PRESERVE THE INTEGRITY OF CRITICAL DATA

(75) Inventors: Frank Joseph McNeal, Rowland Heights, CA (US); Benard Setiohardjo, Orange, CA (US); Michael Lebedev, Los Angeles, CA (US); Brian Allen Kibler, Oakdale, CA (US)

(73) Assignee: TEAC Aerospace Technologies, Inc., Montebello, CA (US)

( * ) Notice: Subject to any disclaimer, the term of this patent is extended or adjusted under 35 U.S.C. 154(b) by 2241 days.

(21) Appl. No.: 10/153,116

(22) Filed: May 22, 2002

(65) Prior Publication Data
US 2004/0062518 A1 Apr. 1, 2004

(51) Int. Cl.
*G06F 17/00* (2006.01)

(52) U.S. Cl.
USPC ........... 707/812; 707/687; 707/831; 707/705; 707/790

(58) Field of Classification Search
USPC .............. 707/104.1, 1–2, 600, 687, 705, 790, 707/812, 831; 711/114; 386/64
See application file for complete search history.

(56) References Cited

U.S. PATENT DOCUMENTS

| 5,479,654 | A | 12/1995 | Squibb |
| 5,521,630 | A | 5/1996 | Chen et al. |
| 5,765,164 | A | 6/1998 | Prasad et al. |
| 5,787,068 | A * | 7/1998 | Arps et al. ................. 369/275.3 |
| 5,809,558 | A | 9/1998 | Matthews et al. |
| 5,931,925 | A | 8/1999 | McNabb et al. |
| 5,974,503 | A * | 10/1999 | Venkatesh et al. ............ 711/114 |
| 6,240,137 | B1 | 5/2001 | Kato |
| 6,263,152 | B1 | 7/2001 | Hisatomi et al. |
| 6,341,318 | B1 | 1/2002 | Dakhil |
| 6,353,173 | B1 | 3/2002 | D'Amato et al. |
| 6,353,632 | B1 | 3/2002 | Moellet et al. |
| 6,356,901 | B1 | 3/2002 | MacLeod et al. |
| 6,366,980 | B1 | 4/2002 | Haines et al. |
| 6,384,997 | B1 | 5/2002 | Wu et al. |
| 6,385,006 | B1 | 5/2002 | Kaczeus et al. |
| 6,614,729 | B2 * | 9/2003 | Griner et al. ....................... 369/1 |
| 6,693,869 | B1 * | 2/2004 | Ballantyne ...................... 369/84 |
| 6,735,601 | B1 * | 5/2004 | Subrahmanyam ..................... 1/1 |
| 6,959,288 | B1 | 10/2005 | Medina et al. |
| 2002/0046404 | A1 | 4/2002 | Mizutani |
| 2002/0059287 | A1 | 5/2002 | Karasudani et al. |

FOREIGN PATENT DOCUMENTS

| EP | 0 962 866 A1 | 8/1999 |
| GB | 2287845 | 9/1995 |
| JP | 8006827 | 1/1996 |
| JP | 09 161405 | 6/1997 |
| JP | 200357112 | 12/2000 |
| KR | 20020014296 | 2/2002 |

OTHER PUBLICATIONS

European Search Report EP03731249.

* cited by examiner

*Primary Examiner* — Sana Al Hashemi
(74) *Attorney, Agent, or Firm* — Cantor Colburn LLP

(57) ABSTRACT

A method and system for minimizing loss of critical digital data while such data is being written to a storage medium. The critical digital data is written to a digital storage medium in small blocks or segments. As each segment is transferred to the storage medium, the file allocation table is updated and the file is closed. By segmenting the files into smaller file segments, the amount of critical data lost as a result of a system failure or power loss is reduced. During playback, the file segments are dynamically assembled allowing playback of the digital data in a continuous manner.

14 Claims, 11 Drawing Sheets

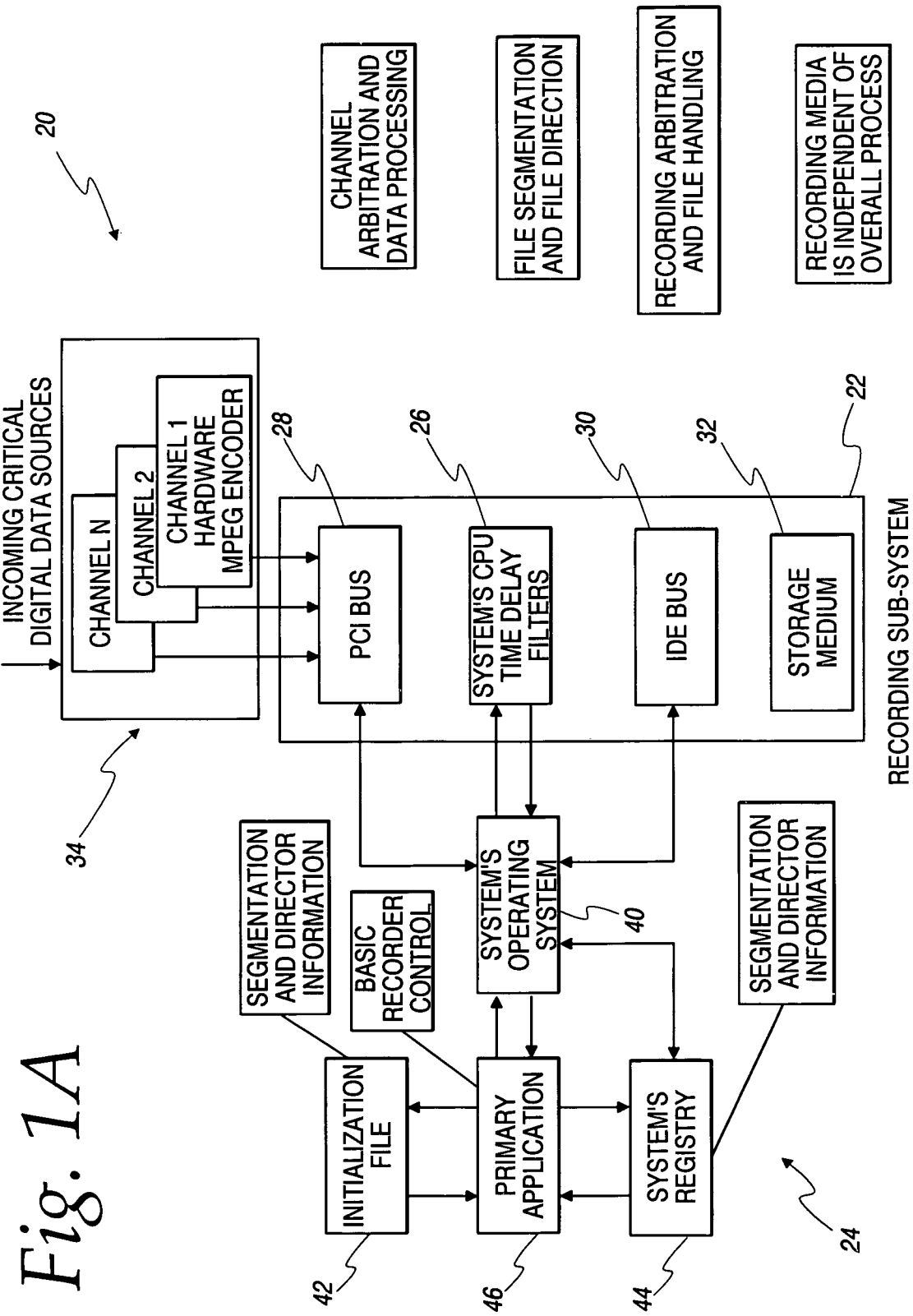

COLLECTING DATA DURING RECORDING

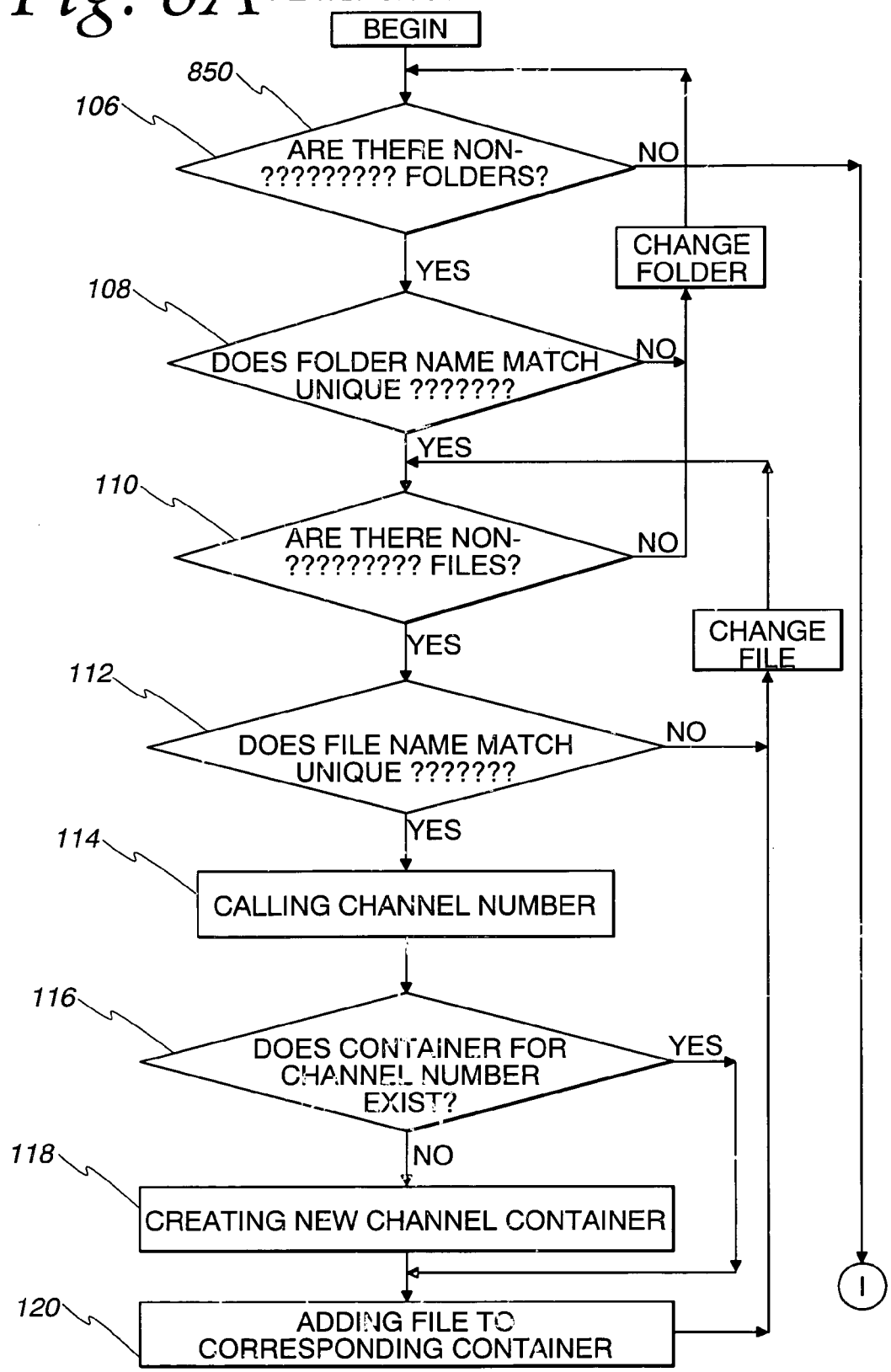

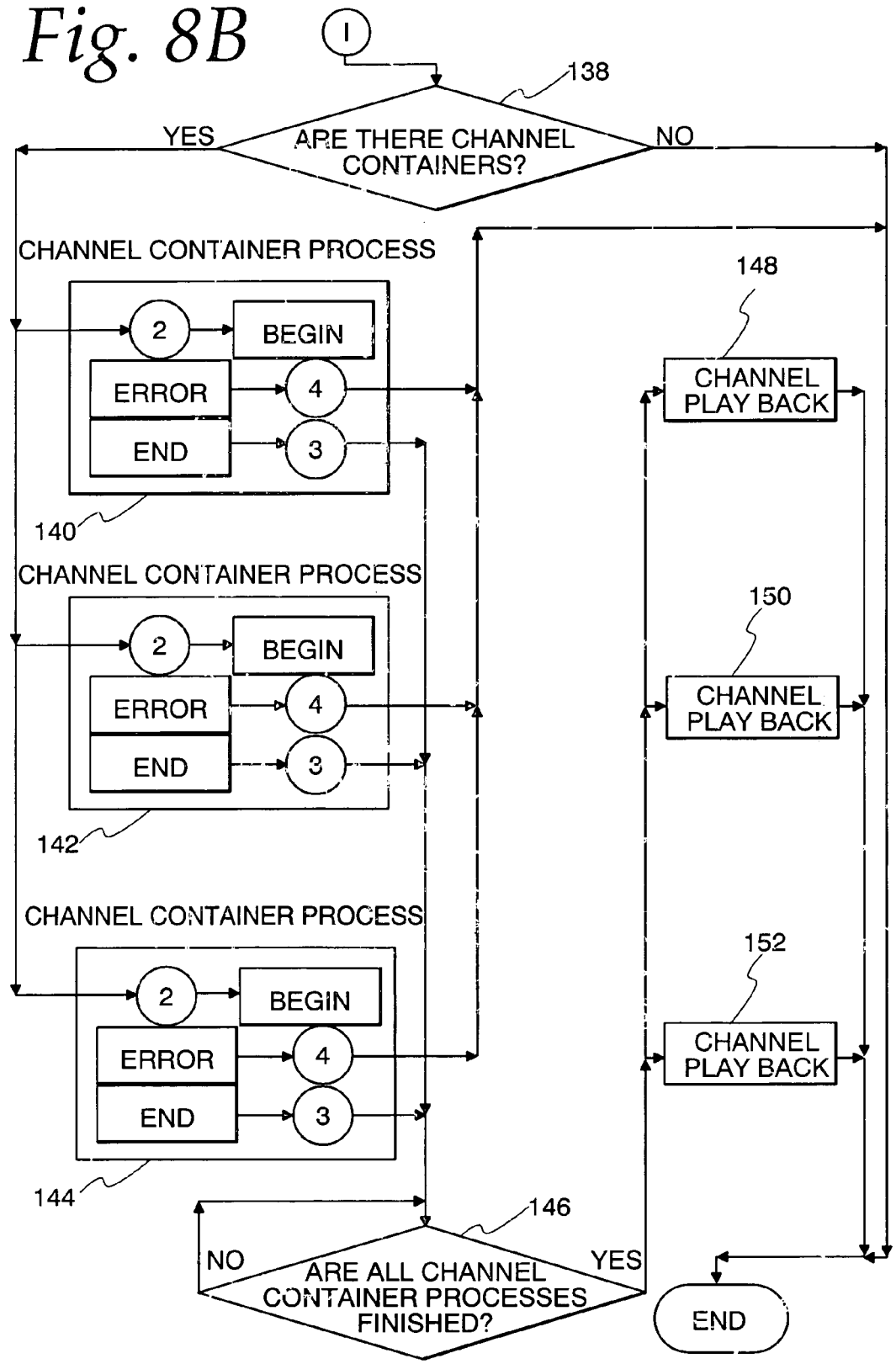

VIDEO AND AUDIO RECORDING USING FILE SEGMENTATION TO PRESERVE THE INTEGRITY OF CRITICAL DATA

COMPUTER APPENDIX

This application includes a Computer Listing Appendix on compact disc, hereby incorporated by reference.

BACKGROUND OF THE INVENTION

1. Field of the Invention

The present invention relates to a system and method for recording critical digital data on a storage medium and more particularly to a system and method in which the critical data is written to the storage medium in segments in order to reduce the loss of critical data as a result of system failure while the critical data is being written to a storage medium and to a playback system in which the segments are played back in real time.

2. Description of the Prior Art

Various systems are known for writing data to various types of storage mediums. An exemplary type of storage medium is a disk drive, for example, as disclosed in commonly-owned U.S. Pat. No. 6,385,006. Examples of systems for writing digital data to such storage mediums are disclosed in U.S. Pat. Nos. 6,366,980; 6,341,318; 6,356,901 and 6,384,997. Such systems are known to record digital data including streaming digital data in various formats, such as the Moving Picture Experts Group (MPEG) format; a popular standard for both video and audio compression.

Computer operating systems are known to open a file or multiple files and update the files as data is transferred to and from the storage medium. More particularly, known operating systems utilize a file allocation table (FAT) that is updated with the time that each file is modified. The file is closed when the data transfer is complete. Should a system failure or power loss occur before the file is closed, data associated with the file is normally lost. Accordingly, critical data, such as video and/or audio data, can be lost while being written to a storage medium. Thus, there is a need for a system for reducing the loss of critical data as a result of a system failure when such data is being written to a storage medium.

SUMMARY OF THE INVENTION

The present invention relates to a method and system for reducing the loss of critical digital data while such data is being written to a storage medium. In particular, in accordance with an important aspect of the invention, the critical digital data is written to a digital storage medium in small blocks or segments. As each segment is transferred to the storage medium, the file allocation table is updated and the file is closed. By segmenting the files into smaller file segments, the amount of critical data lost as a result of a system failure or power loss is reduced. During playback, the file segments are dynamically assembled allowing playback of the digital data in a continuous manner.

DESCRIPTION OF THE DRAWINGS

These and other advantages of the present invention will be readily understood with reference to the following specification and attached drawing wherein:

FIG. 1A is a block diagram of a recording subsystem which forms a part of the present invention.

FIGS. 8A-8D are software flow diagrams of the playback subsystem in accordance with the present invention.

DETAILED DESCRIPTION

Figure 1B:
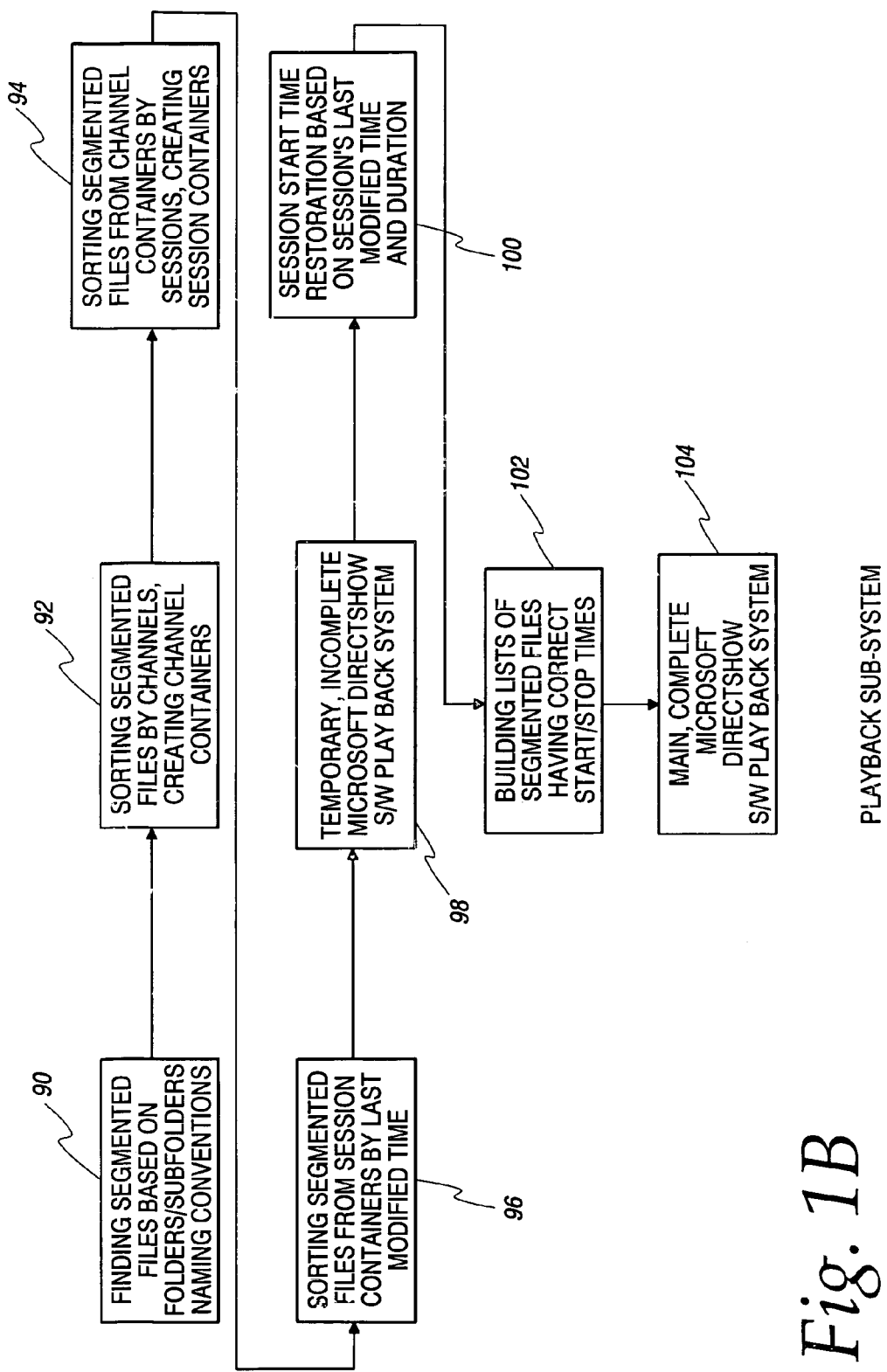
FIG. 1B is a block diagram of a playback subsystem in accordance with the present invention.

The present invention relates to a method and system for reducing the risk of loss of critical digital data, for example, audio and video data, such as MPEG streaming video data as a result of a system failure or power failure, while such digital data is being written to a storage medium, such as a disk drive, for example, as disclosed in the commonly-owned U.S. Pat. No. 6,385,006, hereby incorporated by reference. The principles of the present invention are applicable to various other types of digital data, such as digital data in the form of pulse code modulation (PCM) data as well as digital data in various other formats, such as MIL-STD-1553 format and virtually any data format that can be recorded on a mission data recorder, for example, an MDR-80 mission data recorder, as manufactured by TEAC.

In accordance with an important aspect of the invention, the critical digital data is recorded in segments and played back in real time and includes a recording subsystem and a playback subsystem. The recording subsystem includes a data capture filter, which creates the segmented files. The playback system in one embodiment includes a playback decoder which accepts a file list and treats it as a single contiguous file.

Recording Subsystem

A high-level block diagram of the recording subsystem is illustrated in FIG. 1A and generally identified with reference numeral 20. As shown, the recording subsystem 20 includes a personal computer (PC) based hardware system, shown within the box 22, and a software system, generally identified with the reference numeral 24. The PC hardware system 22 is merely exemplary and includes a central processing unit (CPU) 26, a PCI bus 28, an IDE bus 30 and a storage medium, such as a disk drive, for example, a disk as described in detail in commonly-owned U.S. Pat. No. 6,385,006, hereby incorporated by reference. In the exemplary system shown, the critical digital data is applied to one or more MPEG encoders, generally identified with the reference numeral 34 for encoding the digital data into MPEG format. Such MPEG encoders are connected to the system by way of the PCI bus 28.

MPEG encoders are generally known in the art. An exemplary MPEG encoder is disclosed in U.S. Pat. No. 6,240,137, hereby incorporated by reference. Multiple MPEG encoders 34 are provided to coincide with a user selectable number of channels, as will be discussed in more detail below.

Figure 2:
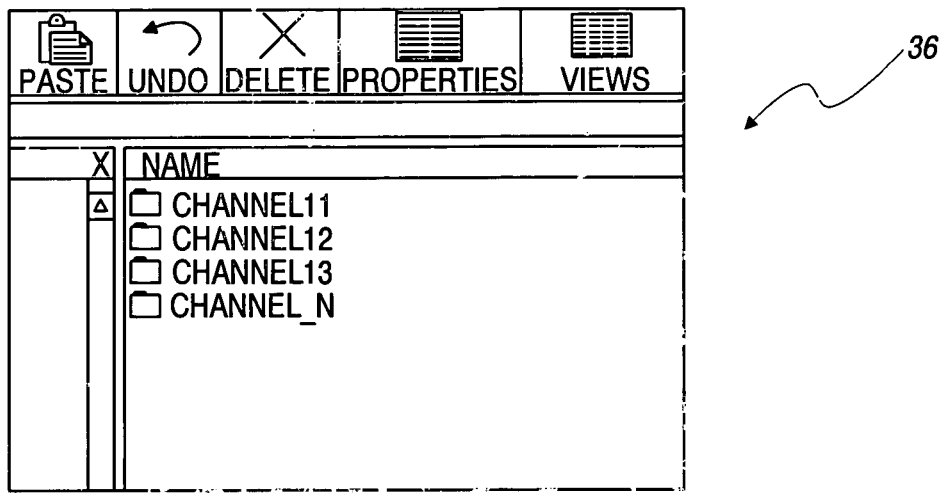
FIG. 2 is an example of a default top-level directory structure used in accordance with the present invention.
Figure 3:
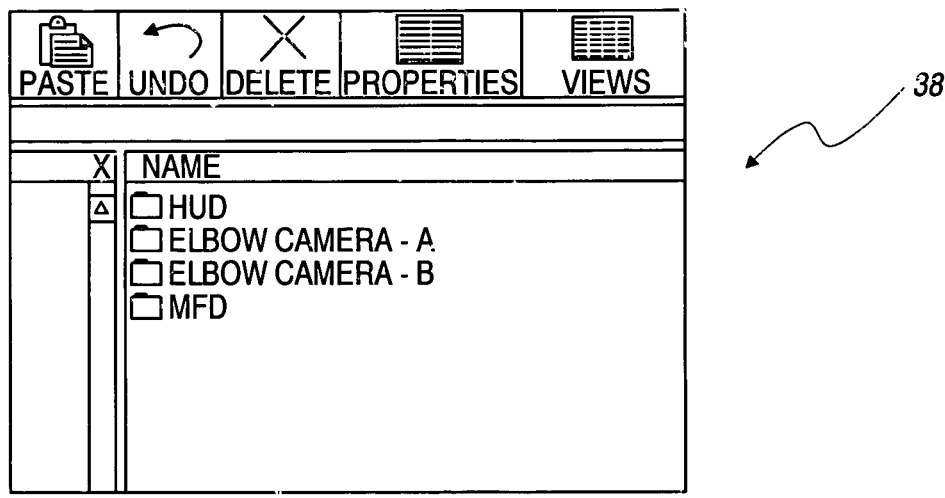
FIG. 3 is an example of a user-defined top-level directory structure in accordance with the present invention.

A top level directory is created by the recording subsystem 20. The number of subdirectories in the top level directory corresponds to the number of user selectable channels of the device. A default top-level directory is illustrated in FIG. 2 and identified with the reference numeral 36. A user-defined top level directory 38 is illustrated in FIG. 3. The number of channels as well as channel names are user selectable and stored, for example, in an initialization file 42 (FIG. 1A). The subdirectories in the top level directories are used to identify each recording channel. For example, the default top level directory 36 identifies default file names, for example, channel 01, channel 02, channel 03 and channel_n, if no user-defined channel names are defined.

The top level directory (TLD) may be stored anywhere on the host storage medium 32. The top level directory need not be in the root directory defined by the operating system. As will be discussed in more detail below, a playback application automatically detects and plays back based upon the top level directory.

Figure 4:
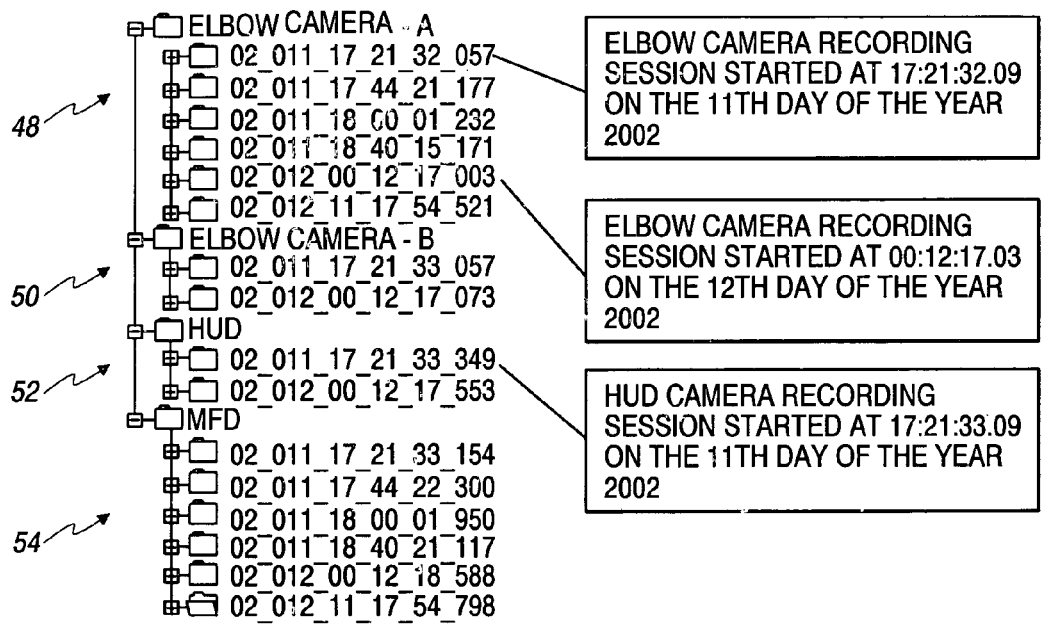
FIG. 4 is an example of a first-level subdirectory, shown with exemplary multiple recording sessions in accordance with the present invention.

Recording on any given channel can start and stop at any given time. In order to accommodate the unpredictable nature of video recording, the video recording sessions are separated. In particular, a first level subdirectory is provided which provides a list of time stamped recording sessions, which allows the system to successfully assemble the segments during playback. An exemplary first level subdirectory for an exemplary number multiple recording sessions is illustrated in FIG. 4. As shown in FIG. 4, an exemplary four channel recorder is shown, each with multiple independent recording sessions. In this example, the top level directory is identified with the subdirectory names: "Elbow Camera-A"; "Elbow Camera-B"; "HUD" and "MFD". Under each of these subdirectories is a list of files representing multiple recording sessions for each file. Each recording session file is time stamped by a data capture filter, discussed below, which forms part of the recording application. As shown in FIG. 4, the time stamp "02_011_17_21_32_097" represents that the "Elbow Camera A" recording session started at 1700 hours (military time), 21 minutes, 32.097 seconds on the 11th day of the year 2002.

Figure 5:
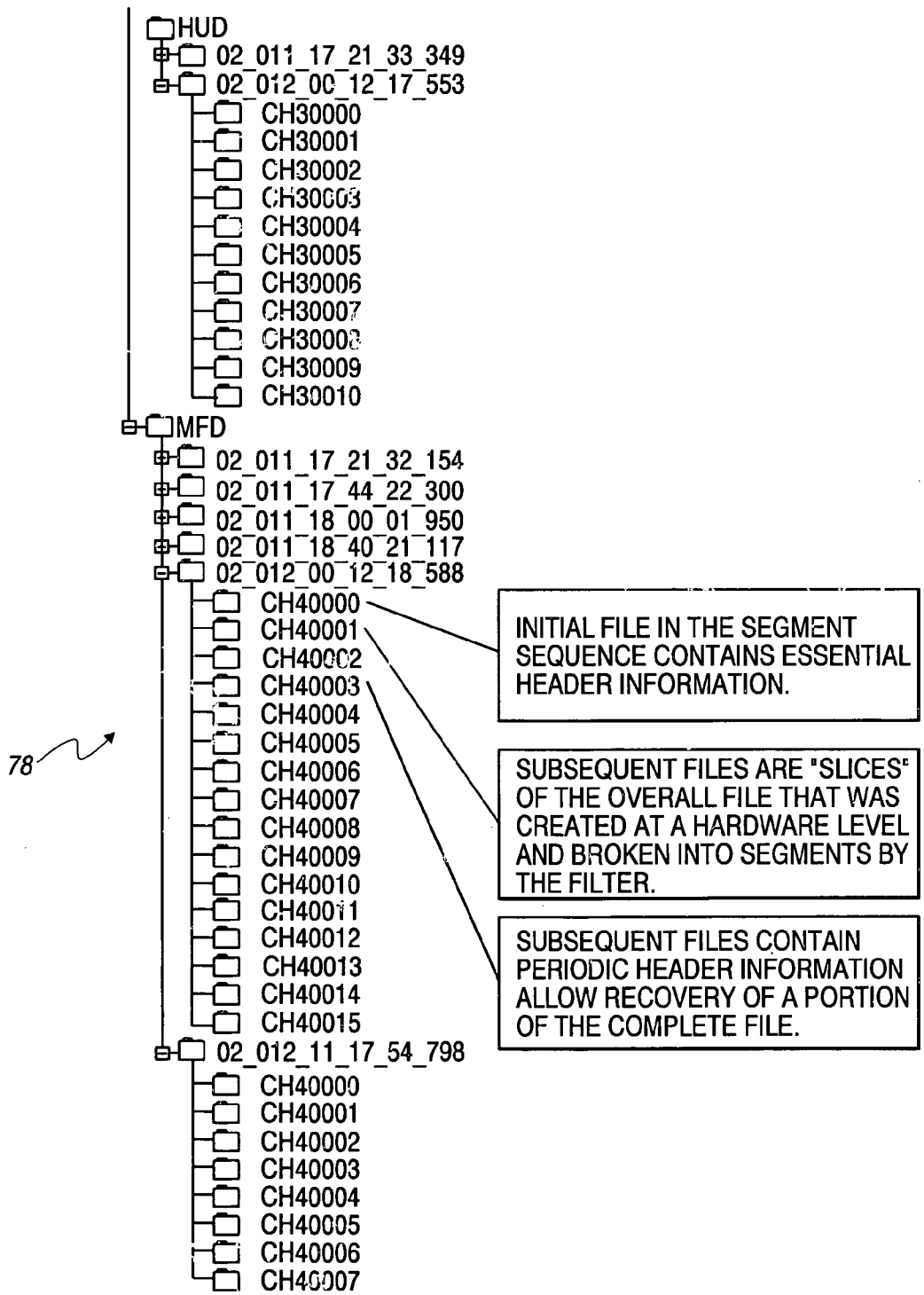
FIG. 5 is an exemplary segmented file structure in accordance with the present invention.

The segmented file structure used by the recording and playback applications is illustrated in FIG. 5. In particular, each segment utilizes a file name which includes a time stamp sequence number as well as a time stamp-indicating when the file was last modified based upon the time given by the system clock. The time stamps facilitate combining of the data file from the file segments. FIG. 5 defines basic segment strategy and its individual components. As shown, in FIG. 5, one segmented file recording session for a multi-function display (HUD) began at 11:17:54.798 on the twelfth day of the year 2002. In this example, the segment size is based on time. The actual time may be, for example, based on mathematical equations which pertain to the recording bit rate and the requested time.

Recording Application

The recording application, for example, the application 46 identified in FIG. 1A, reads the initialization file 42 or system registry 44 on start up. In accordance with an important aspect of the invention, the length of the recording segment is adapted to be defined by the user by either time or size and stored, for example, in the initialization file 42. The time or size can be set to zero is which case the system will record a contiguous non-segmented file. Additionally, each of the recording channels can be independently defined. More particularly, each recording channel may be selected to have a unique segment size.

Initially after the initialization file 42 or system registry 44 is read on start up, the recording application 46 creates a directory structure, for example, a default top level directory structure 46 or a user directory with user defined directory names as illustrated in FIG. 3. As mentioned above, the number of channels in the top level directory is also defined by the user and stored in either the initialization file 42 or the system registry 44. Based upon the directory information defined by the user, the recording application 46 will create the necessary directory structure and pass the information on to a data capture filter, discussed below, and the MPEG encoders 39 (FIG. 1A).

The recording application 46 controls the starting and stopping of the independent channels based upon input to external devices. When a start_record command is received, the recording application 46 passes this information to the data capture filter, which, in turn, creates a first level subdirectory, as illustrated in FIG. 4, and time stamps all the session file names by way of a recording system clock, which may be user defined. Once the session directory is opened, recording begins. Once recording begins, the recording application 46 monitors the status of the recording being constructed by way of a multi-thread software environment and continues recording until either a stop_record command is received and passed to the data capture filter or the data capture filter records a recording error to the recording application. When the recording application 46 receives a recording error status, the session is closed and the data capture filter status is monitored. If and when the error is eliminated and corrected as reported to the recording application 46 from the data capture filter and the recording application has not yet received a stop recording command, the recording application 46 will automatically restart the recording under a new session directory. Once a session is opened, the data capture filter issues hardware commands that physically stop recording at the intervals defined by the initialization file 42.

Each session file, for example, as illustrated in FIG. 4, is a stand-alone file with all required information for playback on a standard media player capable of playing, for example, MPEG-1 or MPEG-2 files. The only unique aspect for each file segment is the session file name which contains a time stamp. Like the first level subdirectory time stamp, the session file name is based upon the recording systems clock allowing future recombination of segments into contiguous media files at a later time. As each file segment is completed according to the duration specified in the initialization file 42, the files are closed and the systems file allocation table is updated. At any point after the file is closed a system failure, such as a loss of power, will not likely affect files already written and closed.

The data capture filter forms an important aspect of the recording. The data capture filter has two unique aspects. First, the data capture filter can co-exist with multiple filters allowing the simultaneous recording of multiple channels. Secondly, the data capture filter can create file segments as described herein with accurate time stamps allowing future combination and playback in a contiguous fashion of multiple synchronized in time. In general, user-specified information from the initialization file 42 or system registry 44, depending on the system operating system 40, is read by the recording application 46 and passed on to the data capture filter. The information from the initialization file 42 or system registry 44 includes all necessary information regarding the video, for example, MPEG video, to be recorded. Based upon information received from the recording application 46, the data capture filter creates individual file segments ranging in size, for example, from seconds to infinity. Based on the information received from the initialization file 42, the data capture filter creates complete stand-alone files for the duration specified by the segment information. Each file is time stamped by the data capture filter and placed into the proper session directory for future combination. The management of the directories and file names is under the complete control of the data capture filter. The initialization file information defines the segment size and the top level directory. All other aspects of the segments are controlled by the data capture filter.

The data capture filter works closely with the associated MPEG encoder 34. Each generation of hardware encoders have a custom data capture filter to facilitate unique aspects of the hardware implementation. However the basic concept of the present invention will remain the same. Information on specific segments and their size is passed from the initialization file 42 through the recording application 46 to the data capture filter, allowing transparency of hardware changes to the overall system.

Exemplary Flow Diagrams Recording Application

Figure 6:
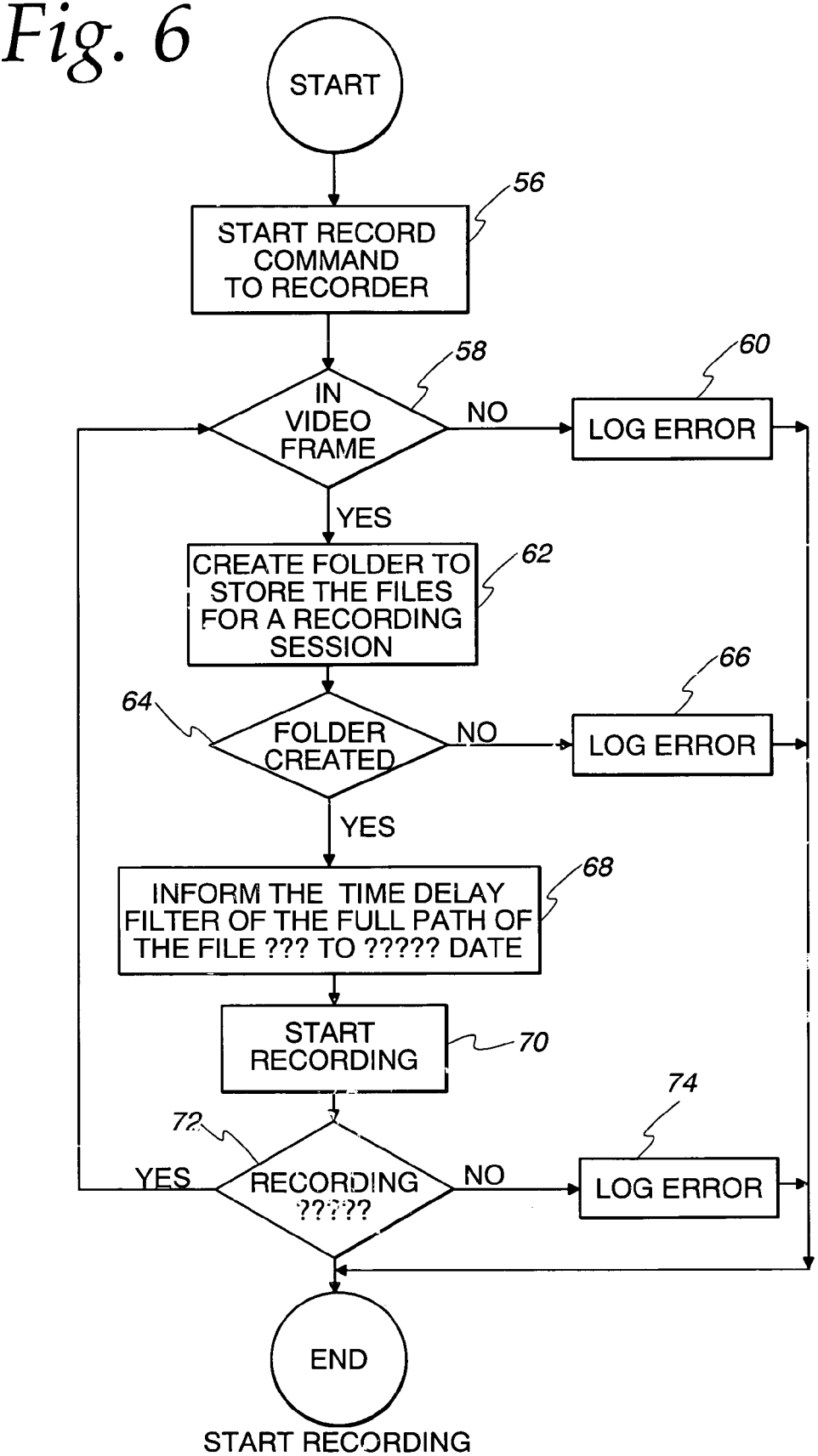
FIG. 6 is a software flow diagram of the record subsystem in accordance with the present invention.

An exemplary flow diagram for the recording application 46 is illustrated in FIG. 6. Initially, the system is initialized when a start_record command is received, as indicated in step 56. After the start_record command is received, the system checks the hardware encoders 34 in step 58 to determine if a video signal is present. If not, an error is logged in step 60 and the recording application session ends. If the system determines the video signal is present in step 58, a folder is created for each of the session and assigned a session file name as discussed above. The system checks in step 54 to determine whether the folders were created. If not, an error is logged in step 66 and the session is ended. If the folders have been created as determined in step 54, the system provides the data capture filter with the file path name in step 68. As shown in FIG. 5, the data capture filter then creates file segments. The segment size is determined based on the segment duration and the bit rate for each channel. The segment is passed to the data capture filter when the filter graph is created as part of the thread initialization. The system then checks in step 72 to determine if recording has started. If not, an error is logged in step 74. The system continuously loops back to step 58 and creates new file segments until the specified number of segments for that channel has been recorded.

Figure 7:
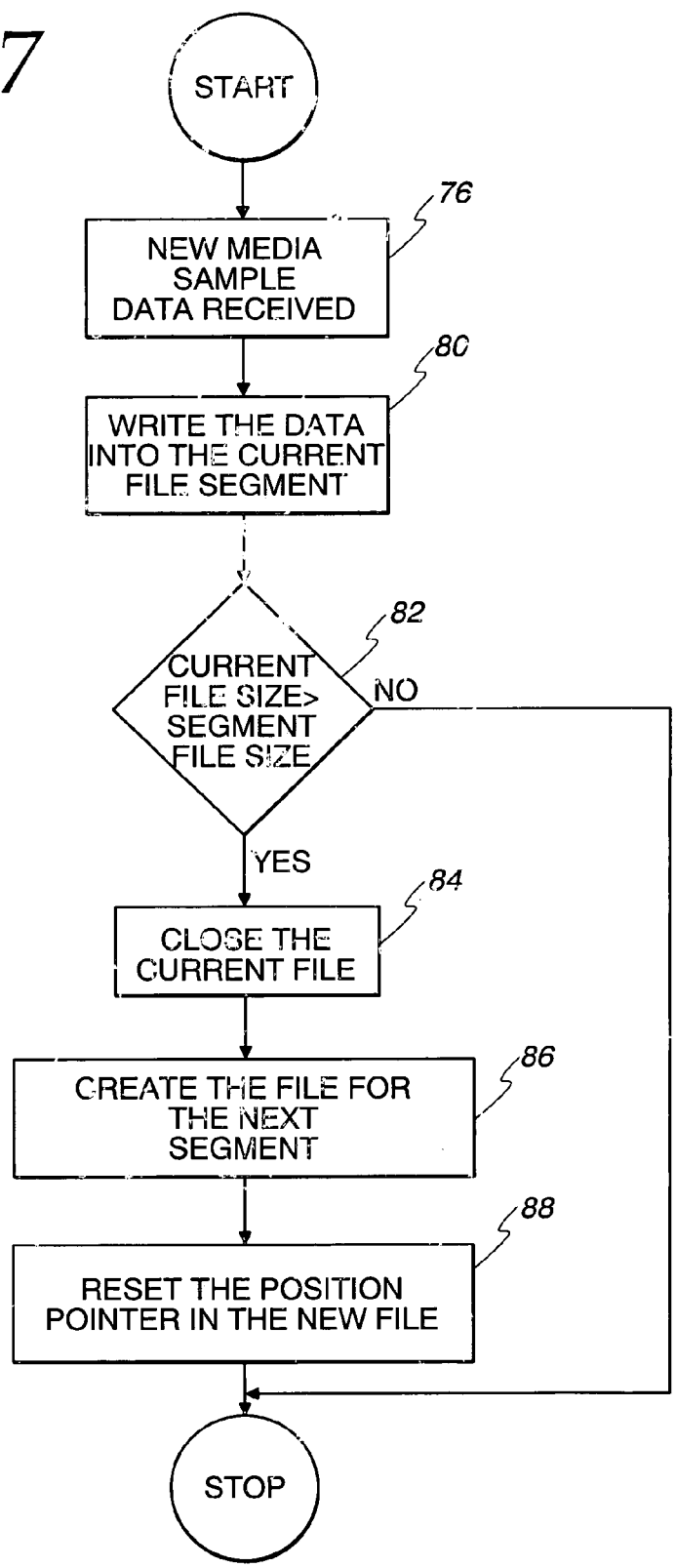
FIG. 7 is a software flow diagram of a data capture filter which forms a part of the present invention.

FIG. 7 is an exemplary diagram of a data capture filter for use with the recording application 46 in accordance with the present invention. Initially, in step 76, once the recording session files have been opened by the recording application 46, the data capture filter, for example, a standard Microsoft directX filter, receives the media sample in step 76 and generates a file segment, for example, a file segment number 78, as illustrated in FIG. 5 and writes that data into the current file segment in step 80. In step 82, the system checks whether the current file size is larger than the segment file size 82. If not, the system returns and awaits for additional media samples to be received from the recording application 46. As new samples are received from the recording application, additional segment files are created, for example, with a base file name and a multiple character sequence number. For example, if the file name is d:/channel1/02_064_14_32_51_620/ch1.mpg, the first segment may be, for example, d:channel1/02_064_14_32_51_620/ch1001.mpg with the next segment being d:/channel1/02_064_14_32_51_620_ch1002.mpg. If the current file is greater than the segment file size, the current file is closed in step 84 and a file for the next segment is created in step 86. In step 88, a position pointer is reset for the new file in step 88.

Playback System

The playback subsystem includes a playback subsystem and playback application. The playback system is a system that splits, decodes and displays a standard media file and may include various standard media players, such as Microsoft Media Player, and any other filtered plug-ins that allow playback, for example, of MPEG-based video files. The playback system processes a file list as opposed to a single media file. As discussed above, each media file is composed of a group of file segments. Although the file segments are stand-alone entities, the file segments are combined to enable the file segments to be viewed as a whole. Although the files can be concatenated after recording and passed any standard media player, the time required for such an application would render the system cumbersome. In order to alleviate this problem, the playback subsystem receives a file list (as opposed to a single file) and assembles the data in real time.

The playback application operates at a higher level than the playback subsystem and in general controls the playback subsystem. The playback application is responsible for the coordination of multiple channels, sessions and segments in real time. The playback application initially scans playback media looking for valid file segments for playback. Once valid segments are established, the playback application works upward through the directory structure to determine session times and recording channels and builds a table for a container of recording channels, session times and segment information. This information is manipulated to direct playback by the playback system.

The playback application includes various individual components that allow for synchronized playback of multiple video channels. Initially, the playback application determines whether actual segmented video files exist. This process is conducted irrespective of the file name and is based only on valid data. Once a valid file is established, the system checks the current directory to determine if multiple files of the same type of system exists for a specific directory. If additional files exist, time stamps are then reconciled on the files within the directory to determine if the files are from a common session. If the files are from a common session, this information is added to the container for use during playback. Checking independent files and the time that the file was last modified to the file has another level of data security to the overall system. If multiple files are found in a common directory that do not appear as part of segmented session, file names are added to playback list as separate entities. This ensures that the data is not discarded through the discontinuities in time.

Once valid segments are established, the playback application moves upward in the directory structure to determine when a session was created. There are two methods to establish session start times. In one method, the session directory name is analyzed. As described previously, the session directory name contains the time stamp information and indicates when the session was created. If the time stamp information within the directory name, the playback application utilizes the system's time stamp based upon when directory was created to approximate the actual session time. Once the session time is established, the playback application moves up the directory hierarchy to determine the channel the actual recording was made on. Channels can be identified by names or numbers. More specifically, the playback application passes a pointer to the segmented files on to the segment playback system. All other information used by the playback application is used by the playback application itself for resynchronization of the multiple recordings.

Two playback applications are contemplated. In a first playback application, a special filter is used to create all the media information dynamically needed by the playback system based upon each segment and its respective content. In this embodiment, a schedule is developed for playback of the segments. After playback of a segment, a filter, for example, a Microsoft Direct Show filter, may be used to switch to the next segment according to the schedule to enable playback by a standard media player. In such an application, the media player actually plays back a list of files in the same manner it plays back a single file. This allows the actual playback of the individual segment without the inclusion of the initial segmented file that contains the original header information. The second method of playback does not include a filter but nonetheless allows segmented files to be reproduced on any standard windows or Mac-based MPEG media player. In this method, concatenation of the overall media file prior to playback. Concatenation can be accomplished by using any standard is required utility that allows for the concatenation of group files.

Exemplary Flow Diagram for Playback Subsystem

FIG. 1B illustrates a high level software flow diagram of the playback subsystem in accordance with the present invention. Initially, in a playback mode of operation, the system is responsive to a playback command and finds segmented files based on folders/subfolders naming conventions described above, as indicated in step 90. These folders are sorted by channels creating channel containers as indicated in step 92. The channel containers are further sorted by sessions containing session containers, as indicated in step 94. The session containers are sorted by last modified times as indicated in step 96. The last modified time is the time the last piece of data was written to the file. Before presenting to the user all of the segments in a session as a list of files, a determination is made whether the list of files is playable. For example, in the case of MPEG, there should not be any gaps in the presentation time stamp. Secondly, the session of list of files start time needs to be determined. In particular, a temporary playback system is set up. In the case of MPEG files, the Microsoft Direct Show playback system may be used. This system is temporary and is erased after the two tasks above are determined. Even though this system is incomplete in that it is not capable of being used for playback, it is used in a manner transparent to the user to provide a valid list of files and the duration of the list of files. By subtracting the duration from the last segment's last modified time, the session container start time is easily determined. After the session container start time is determined, the temporary and incomplete playback may be erased. In step 100, the session start time is determined based on the session last modified time and the duration. In step 102, a list of segmented files are created with the correct session start and stop times and played in response to a playback command in step 104.

A more detailed flow diagram is illustrated in FIGS. 8A-8D. Initially in step 106, the system interrogates all of the system's folders and determines whether the folders have file names which match the patterns as illustrated in FIGS. 1 and 5 in step 108. In step 110, the system interrogates all of the files in each folder and determines whether the file names match the pattern in step 112. Once it is determined that the file names match the pattern, the channel numbers are determined in step 114. As mentioned above, a container is created for each channel number in steps 116, 118 and 120.

Figure 8C:
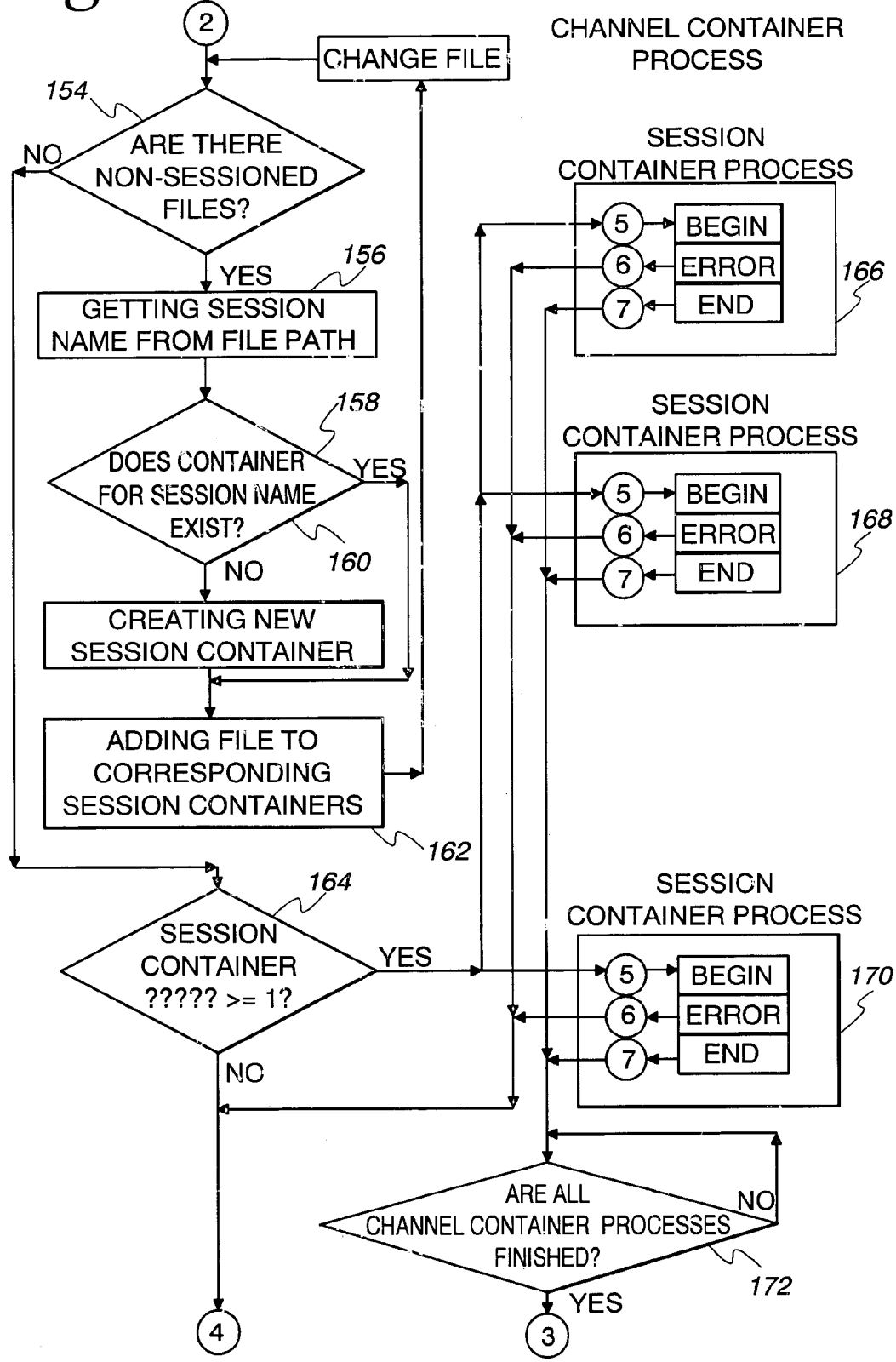
Figure 8D:
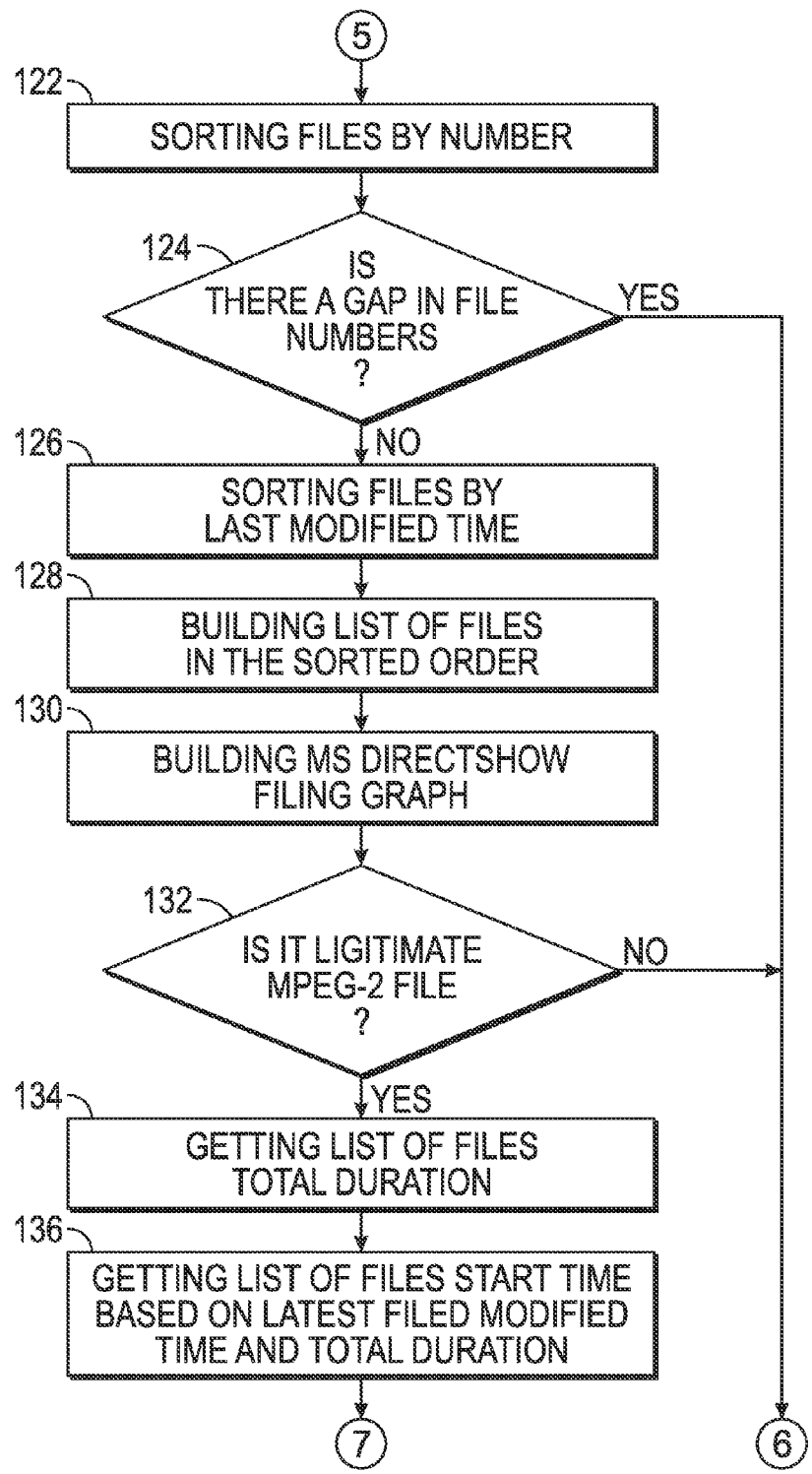

FIGS. 8B-8D relate to sorting the channel containers by sessions and containing session containers. Referring first to FIG. 8D, files are initially sorted by number in step 122. In step 124, the system determines whether there is a gap in the file numbers. If so, the system returns an error. If not, the files are sorted by last modified time in step 126 and a list of files is built in step 128. In step 130, a Microsoft Direct Show filter list, for example, is built in step 130. Subsequently in step 132, the system determines whether the file is, for example, a legitimate MPEG-2 file. If so, a list of files is obtained in step 134 and the start times are based upon the latest file modified time and total duration in step 136.

The channel container processes are illustrated in FIGS. 8B and 8C. Referring to FIG. 8B, the system determines in step 138 whether there are channel containers. Assuming there are multiple channel containers, the system sorts all of the channel containers for session files in steps 140, 142 and 144 until all of the channel containers have been interrogated as indicated in step 146. The session files are then played back for each channel in steps 148, 150 and 152.

FIG. 8C illustrates a flow diagram for sorting the channel containers for session files. Initially, in step 154 the system determines whether there are any non-interrogated files. If so, the system obtains the session name from the file path in step 156. In step 158, the system determines whether a container exists for the session name found in step 156. If not, a new system container is created in step 160 and added to the session container file in step 162.

If all of the files have been interrogated, the system determines in step 164 whether are any session containers and obtains the start times based on the latest file modified time and total duration in steps 166, 168 and 170. This process is continued until all of the containers have been processed in step 172.

Obviously, many modifications and variations of the present invention are possible in light of the above teachings. Thus, it is to be understood that, within the scope of the appended claims, the invention may be practiced otherwise than as specifically described above.

We claim:

1. A data recording system which minimizes the risk of loss of data resulting from a loss of power, the recording system comprising: a recording subsystem for recording data on a disk drive, said data having a file size less than the maximum file storage capability of said disk drive, the recording subsystem including a system for breaking down said data into a plurality of segmented files that are relatively smaller than said file size of said data and storing said segmented files on said disk drive and closing each of said segmented files after each of said segmented files has been stored on said disk drive, wherein the size of said segmented files is user-selectable.

2. The data recording system as recited in claim 1, further including a playback subsystem for assembling said segmented files defined by size and recording time for synchronous playback of said segmented files on a predetermined standard media player.

3. The system as recited in claim 1, wherein the size corresponds to the length.

4. The system as recited in claim 1, wherein the size corresponds to the recording time.

5. The system as recited in claim 1, wherein said recording system is a multi-channel recording system.

6. The system as recited in claim 5, wherein said recording system creates a top level directory, which identifies each of the channels.

7. The system as recited in claim 5, wherein the number of channels is user defined.

8. The system as recited in claim 6, wherein said recording subsystem wherein default file names are provided for each of said files in said top level directory.

9. The system as recited in claim 6, wherein said recording subsystem enables the file names in said top level directory to be user specified.

10. The system as recited in claim 6, wherein said recording system includes a first level subdirectory which session files, each time stamped and corresponding to a separate recording session.

11. The system as recited in claim 10, wherein said files are named as pointers to actual file segments.

12. The system as recited in claim 10, wherein said session files are named to include the recording session starting time.

13. The system as recited in claim 10, further including a data capture filter for creating one or more segment files for each recording session file.

14. The system as recited in claim 13, wherein the size of said segmentation files are user defined.

* * * * *